Jan. 20, 1959 F. V. ADAMS 2,869,785

SIGNAL TRANSLATING DEVICE

Filed Dec. 23, 1955 2 Sheets-Sheet 1

INVENTOR.
FRANCIS V. ADAMS

BY Paul M. Brennan

AGENT

INVENTOR.
FRANCIS V. ADAMS
BY Paul M. Brennan
AGENT

United States Patent Office 2,869,785

Patented Jan. 20, 1959

2,869,785

SIGNAL TRANSLATING DEVICE

Francis V. Adams, Endicott, N. Y., assignor to International Business Machines Corporation, New York, N. Y., a corporation of New York Application December 23, 1955, Serial No. 554,993

8 Claims. (Cl. 235—61)

My invention relates to signal translating devices, and particularly to an improved arrangement for translating a step voltage signal to a first and a second output voltage signal bearing a relationship to the step voltage signal in accordance with the value of the step voltage. More particularly, my invention relates to an arrangement for providing addition of binary numbers, in which the incoming binary numbers to be added are represented in the form of the presence or absence of certain values of voltage on one or more input terminals, and the output of the added binary numbers is provided in the form of sum and carry output voltages.

It has previously been proposed to obtain algebraic addition of voltage values by providing a plurality of electron discharge device amplifiers arranged to have a common load impedance, the voltage developed across this impedance being proportional to the number of input voltages existing simultaneously on the input terminals to the amplifiers. Accordingly, the output voltage developed at the common plate or anode load of the amplifiers is a step voltage, the magnitude of which is inversely proportional to the number of input signals existing at any one time. Such arrangements are well known in the art under the general term of Kirchhoff adders. In some systems, however, it is desired to provide an output in the form of discrete voltages which indicate in binary fashion the sum of the numbers to be added plus the carry function which must be provided in the step-by-step addition of two binary numbers. Accordingly, it is an object of this invention to provide an improved arrangement for translating a step voltage, such as provided by a Kirchhoff adder, into discrete voltages indicative of the sum and carry functions of binary addition.

Another object of this invention is to provide an improved arrangement for converting binary input voltages to a step voltage, and thereafter producing sum and carry output voltages indicative of the binary addition of the input voltage values.

Still another object of this invention is to provide an improved electrical adder for binary numbers.

In practicing the invention, there is provided a parallel plate load addition circuit, comprising three substantially identical electron discharge device input amplifiers, arranged with a common plate or anode load impedance, each of the amplifiers having its input connected to a corresponding input terminal. The parts are proportioned and arranged so that the output voltage appearing at the common anode connection of the three amplifiers is inversely proportional to the number of input signals existing at any one time, so that this voltage has a stepped value which is related to the number of signal inputs supplied to the apparatus at any given time. This step voltage is supplied to the input of a cathode follower stage, the cathode or output circuit of which governs the control electrodes or grids of a first and a second electron discharge device, in such manner that the conductive or non-conductive condition of the first and second electron discharge device is related to the value of the output or cathode voltage of the cathode follower. In addition to controlling the grids of the first and second electron discharge devices, the cathode or output voltage of the cathode follower is also utilized as an operating or anode voltage source for the first electron discharge device, being connected to the anode of the first electron discharge device through a suitable anode load impedance. The operating voltage for the second electron discharge device is supplied from a substantially constant voltage source. The parts are proportioned and arranged so that the first and second electron discharge devices will cut off and cease conducting when the voltage developed at the cathode of the cathode follower tube indicates that at least two of the three input terminals are energized. Under these conditions, the second electron discharge device will produce an output voltage since its plate current is cut off and the anode voltage can rise to a value approaching that of the voltage supplied thereto from the constant voltage source. In the case of the first electron discharge device, the parts are proportioned and arranged so that the drop in cathode follower output voltage caused by a single input terminal being energized will cause a predetermined reduction in the output voltage at the anode of the first electron discharge device. When two input signals are concurrently supplied to the input terminals, the cathode follower output voltage will drop sufficiently to cut off conduction in the first electron discharge device, so that the anode voltage will again rise to a predetermined level. Further reduction in the cathode follower output voltage as a result of all three input terminals receiving concurrent signals will, in addition to maintaining the first electron discharge device cut off, lower still further the voltage supplied to the anode so that the output voltage is again decreased. In this manner, voltage values will be supplied from the output connection of the first electron discharge device which are representative of the binary addition of the input signals, and in addition thereto an output voltage will be provided from the output connection of the second electron discharge device indicative of a binary carry operation, when the combination of input signals requires such an operation.

Other objects of the invention will be pointed out in the following description and claims and illustrated in the accompanying drawings which disclose, by way of example, the principle of the invention and the best mode, which has been contemplated, of applying that principle.

Figure 1:
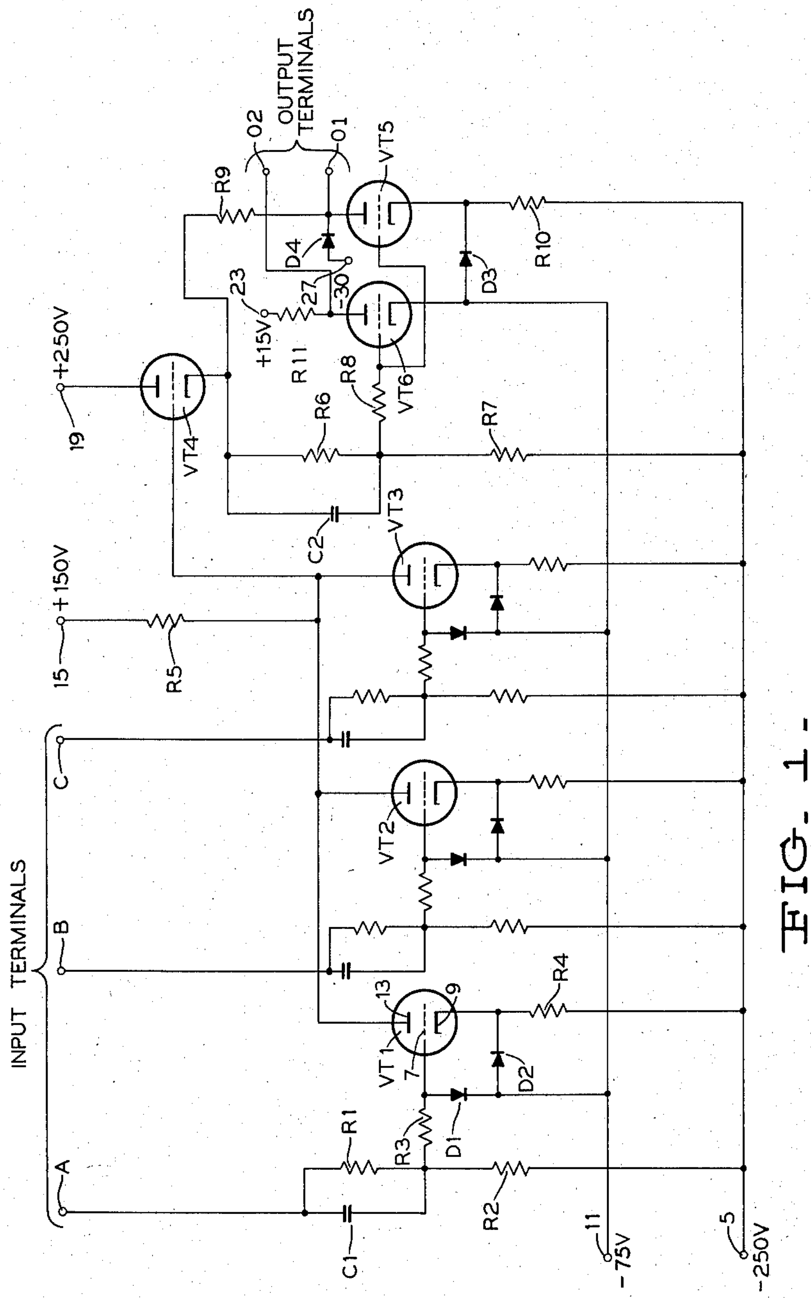
Fig. 1 is a schematic diagram of a signal translating device arranged to provide binary addition in accordance with a preferred embodiment of my invention.

Referring to Fig. 1 of the drawings, there is shown an arrangement of three input or adding amplifiers arranged with a common plate or anode circuit, to perform so-called "parallel plate addition" of incoming signals supplied to the input terminals designated by the reference characters A, B and C. Each of the input amplifiers is similar in construction, and is arranged in such manner that the conduction of each amplifier provides a predetermined increase in the amount of current flowing through a common load impedance, so that the voltage seen at the common anode connection of the three input or adding amplifiers is representative of the sum of the signal voltages present on the three input terminals. This summed or step voltage governs the operation of a cathode follower stage, which has connected thereto a first and a second output stage, comprising a first and a second electron discharge device arranged in such manner that the control of the grids of the first and the second electron discharge devices is responsive to the voltage at the cathode of the cathode follower, the parts being arranged so that the grids of the first and second electron discharge devices in the output stages are biased to the point where conduction is cut off in these devices when the voltage at the cathode of the cathode follower stage falls below a predetermined value. Additionally, the first electron discharge device is arranged to have the anode voltage therefor supplied from the cathode of the cathode follower stage, so that this voltage will vary in accordance with variations in the cathode follower output voltage. Output connections are provided for the first and second output stages, the outputs from these stages being in the form of binary or two-valued voltages indicative of the sum and carry values resulting from binary addition of the input signals.

In the interests of clarity, the cathode heaters for the various vacuum tubes and the circuits for supplying heater energy thereto have been omitted. Additionally, the power supply circuits have been omitted, since any suitable source may be utilized for supplying operating energy to the apparatus.

Each of the input amplifiers in the parallel plate addition stage includes an electron discharge device, such as a conventional triode, designated by the reference characters VT1, VT2, and VT3, associated with the three input terminals A, B and C, respectively. Since the input amplifiers are identical in construction and operation, a detailed description of the amplifier stage including triode VT1 will suffice for the group. The input signals supplied to input terminal A are supplied to the control grid of tube VT1 via a voltage divider comprising resistors R1 and R2 connected in series between the input line and a negative potential terminal 5, indicated as having a potential of −250 volts with respect to ground. Resistor R1 is shunted by a bypass capacitor C1 to improve the high-frequency response of the circuit, and the junction of resistors R1 and R2 is connected to the grid 7 of triode VT1 through a grid current limiting resistor R3. The cathode 9 of triode VT1 is connected to terminal 5 through a cathode resistor R4. Grid 7 and cathode 9 of triode VT1 are connected through asymmetric units D1 and D2, respectively, to a negative potential terminal 11, indicated as having a potential of −75 volts with respect to ground. The asymmetric units or diodes D1 and D2 are poled in such manner that the grid 7 of triode VT1 is prevented from going more positive than −75 volts, and the cathode 9 is prevented from going more negative than −75 volts, since, in either event, the diodes will conduct if the voltages exceed the given values, to thereby maintain the proper operating voltages at the grid and cathode. The anode 13 of triode VT1 is connected in multiple with the anodes of triodes VT2 and VT3, and is directly connected to the control grid of a cathode follower triode VT4. The common anode connection for triodes VT1, VT2 and VT3 is connected to a positive potential terminal 15, having a suitable potential such as +150 volts as indicated, through a common anode load impedance, such as resistor R5.

The parts are proportioned and arranged so that with no input signal present at the input terminals, each of the tubes VT1, VT2 and VT3 will be cut off, and accordingly, the common anode voltage, which is also the voltage supplied to the grid of the cathode follower VT4, will have the value of the voltage supplied to the anode circuit, namely +150 volts.

When a positive-going input signal is supplied to any one of the input terminals, the associated triode will be rendered conductive, so that anode current will flow through the common anode circuit, thereby causing a voltage drop across the common anode resistor R5, with the result that the common anode voltage is lowered by a predetermined amount, for example, of the order of 65 volts. Since each of the input amplifiers can contribute a fixed amount of current drawn through the common anode resistor, it will be apparent that the common anode voltage will have a value which is at all times dependent upon the number of input amplifiers which have signals supplied thereto to render these amplifiers conductive. Thus the common anode voltage, which is supplied to the grid of cathode follower triode VT4, will be in the nature of a step voltage, which will have discrete values ranging between the value of the voltage supplied from the high voltage source, e. g., +150 volts, and will be decreased in steps of approximately 65 volts down to a value which in the present case may be of the order of −45 volts with all three input terminals energized by a suitable signal.

The anode of triode VT4 is connected to a positive potential terminal 19, which as indicated may have a potential of +250 volts. The cathode of tube VT4 is returned to negative potential terminal 5 by two separate paths. The first of these paths includes the resistors R6 and R7 connected in series, with resistor R6 bypassed by a capacitor C2 to improve high frequency response, these resistors acting as a voltage divider to supply a suitable control voltage to the grids of triodes VT5 and VT6 through a grid current limiting resistor R8, so that the voltage supplied to the grids of tubes VT5 and VT6 will depend upon the conductive state of VT4. The second path may be traced through resistor R9, through the anode-cathode path of tube VT5, and through a resistor R10 to terminal 5. Accordingly, it will be seen that the anode voltage supplied to the first output stage including tube VT5 will depend upon the conductive condition of the cathode follower VT4. A diode D3 connected between the cathode of tube VT5 and terminal 11 prevents the cathode of this tube from going more negative than −75 volts.

Tube VT6 in the second output stage is supplied with anode voltage through a resistor R11 connected to a positive potential terminal 23, which, as indicated, may have a substantially constant potential of +15 volts. The cathode of tube VT6 is connected to terminal 11.

Output terminals, designated by the reference characters O1 and O2, are connected to the anodes of tubes VT5 and VT6, respectively. The anode of tube VT5, and hence output terminal O1 are clamped to a −30 volt level by the diode D4, connected between terminal 27, at a −30 volt potential, and the anode of tube VT5, for purposes to be subsequently explained.

Figure 2:
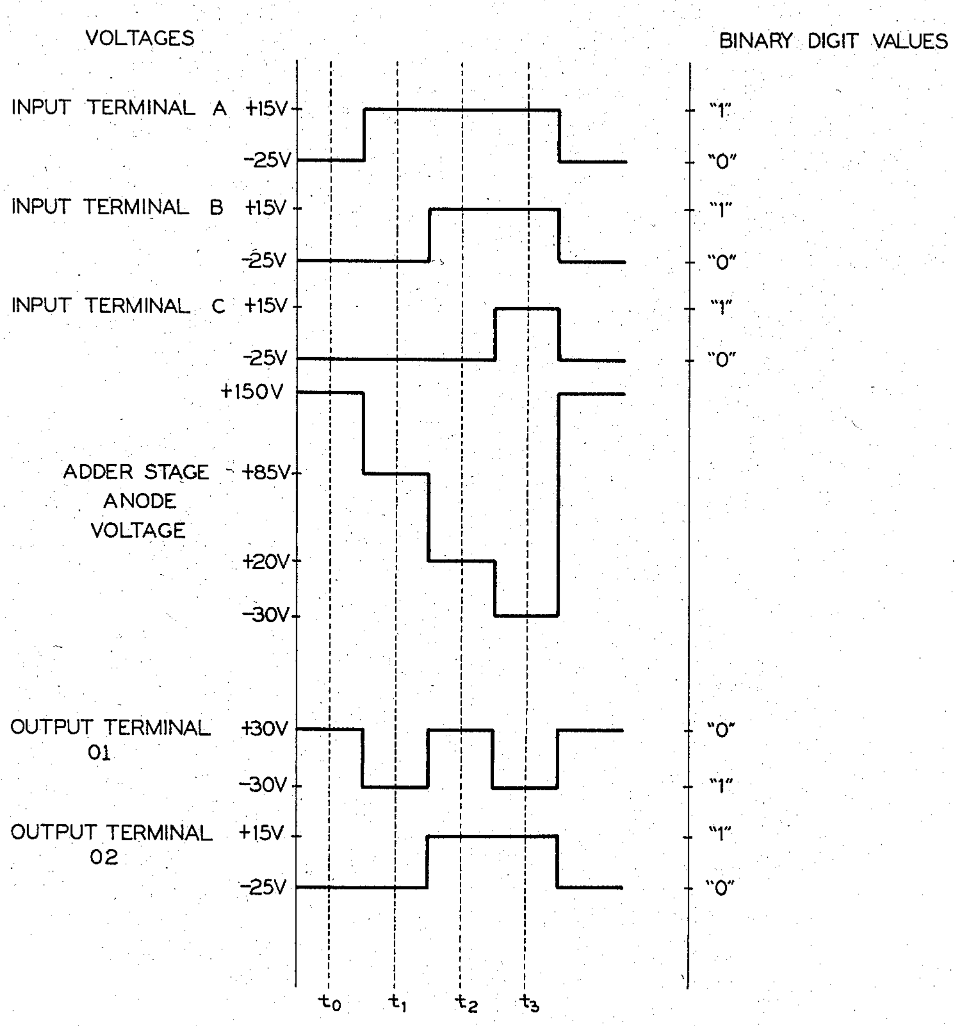
Fig. 2 is a graphical representation of the approximate voltage values encountered at various points in the apparatus, illustrating the operation of the apparatus under different input signal conditions.

The initial condition of the apparatus is illustrated in Fig. 2, at the portion of the graph designated by the reference character $t_0$, where it will be noted that the voltage of all three input terminals is at a quiescent value, of the order of −25 volts. The anode voltage of the adder stage will therefore approximate the supply voltage of +150 volts as shown, since triodes VT1, VT2 and VT3 are cut off. The parts are proportioned and arranged so that the voltage at the cathode of the cathode follower tube VT4 will be of the same order as the voltage applied to its grid, so that under the conditions existing at time $t_0$ the voltage at the cathode of tube VT4 will be approximately +150 volts. The parts are proportioned and arranged so that with the cathode voltage at this value, the tubes VT5 and VT6 will be conductive.

The conduction of tube VT5 produces a voltage drop in the resistor R9, so that the output voltage at the anode of tube VT5, which is also the voltage at output terminal O1, will have a predetermined value with respect to ground, say, of the order of +30 volts, as shown in Fig. 2. This voltage is predetermined by the proper proportioning of R9 and R10. R10, in conjunction with the supply voltage at terminal 5 predetermines the current through R9, which, in conjunction with the voltage at the cathode of VT4, determines the voltage at terminal O1, as specified. Tube VT6 is also conductive as pointed out above, and the voltage at output terminal O2, which is the same as the voltage at the anode of tube VT6, will have a predetermined value, such as —25 volts with respect to ground as indicated in the graph.

Let it now be assumed that a positive-going pulse is supplied to any one of the three input terminals, for example, terminal A, so that the voltage at this terminal increases from —25 volts to some more positive value, such as +15 volts, sufficient to render the associated input amplifier conductive, as shown at $t_1$ on the graph. The associated amplifier will accordingly draw a constant and fixed amount of anode current, so that the common anode voltage of the input amplifiers will be reduced by the drop across the common load impedance to a first intermediate value, which may be of the order of +85 volts, as can be seen from the graph.

The corresponding reduction in voltage at the grid of cathode follower tube VT4 will cause the cathode voltage of this tube to drop, thereby decreasing the voltage supplied to the anode of tube VT5 to a lower value than that obtained in the initial case, so that the anode voltage of tube VT5 and hence the voltage at output terminal O1 falls to a predetermined value, for example, of the order of —30 volts with respect to ground, as shown by the graph. Although the grid voltage supplied to tubes VT5 and VT6 is reduced by the drop of the cathode voltage tube VT4, those tubes will remain conductive at this time, so that the voltage at output terminal O2 does not change at this time. Accordingly, it will be seen that with an input signal supplied to one and one only of the input terminals, the voltage at output terminal O1 will change to a second state and the voltage at output terminal O2 will remain unchanged, for the duration of the input signal.

It will now be assumed that input signals are supplied concurrently to two of the three input terminals, such as terminals A and B. The voltages at various points in the apparatus will accordingly have values of the order indicated by the graph of Fig. 2 at $t_2$. Under these conditions, with two amplifiers conducting, the common anode voltage will be decreased by two decrements to a second intermediate value, for example, of the order of +20 volts. The consequent reduction of the voltage at the cathode of cathode follower tube VT4 lowers the grid voltage of tubes VT5 and VT6 to a value below cutoff, so that these tubes are rendered non-conductive. Although the voltage at the anode of tube VT5 is reduced as a result of the reduced cathode voltage of tube VT4, the cutoff of the tube counteracts this reduction with the result that the anode voltage of tube VT5 rises to a value of the order of +30 volts. Cutoff of tube VT6 allows the anode of this tube to rise to the value of the voltage at terminal 23, of the order of +15 volts. It is accordingly seen that with two input signals supplied concurrently to the apparatus, the voltage at output terminal O1 is established in its first or normal condition, namely at the +30 volt level, and the voltage at output terminal O2 is established at its second value or condition, that is, +15 volts.

Considering now the case in which input signals are supplied concurrently to all three input terminals, the voltages existing in the apparatus under such a condition are illustrated at $t_3$ on the graph of Fig. 2. With all three input amplifiers conducting, the common anode voltage will be reduced to its minimum value, of the order of —45 volts with respect to ground. The accompanying reduction in the cathode voltage of the cathode follower tube VT4 lowers the anode voltage of tube VT5 and also reduces the grid voltage supplied to tubes VT5 and VT6 so that these tubes are cut off. The reduction of anode voltage of tube VT5, plus the cutting off of the tubes, establishes the voltage at output terminal O1 at the second value, namely, of the order of —30 volts, and, since tube VT6 is cut off, the voltage at output terminal O2 is established at its second value, +15 volts. Although the anode voltage of tube VT5 tends to drop to the voltage of the cathode of VT4, i. e., —45 volts, it is prevented from doing so by conduction of diode D4, which holds the voltage at terminal O1 at —30 volts under these conditions.

From the foregoing, it will be seen that the apparatus shown in Fig. 1 and constructed in accordance with the invention, is arranged to provide one or the other of two different output voltage conditions at first and second output terminals, in accordance with the number of input terminals which are supplied with a suitable signal at any given time. Although not limited thereto, the present invention finds its greatest utility as an electrical adder for binary numbers and the manner in which it may be used for binary addition will now be explained.

The addition of binary numbers, which may have either one of two values, usually represented by "0" and "1," and including a "carry," if any, from a previous addition in a lower order, may be understood by considering the following table:

| Combination No. | 1 | 2 | 3 | 4 | 5 | 6 | 7 | 8 | Terminal Reference |
|---|---|---|---|---|---|---|---|---|---|
| Augend | 0 | 0 | 1 | 1 | 0 | 0 | 1 | 1 | (A) |
| Addend | 0 | 1 | 0 | 1 | 0 | 1 | 0 | 1 | (B) |
| Carry | 0 | 0 | 0 | 0 | 1 | 1 | 1 | 1 | (C) |
| Sum | 0 | 1 | 1 | 0 | 1 | 0 | 0 | 1 | (O1) |
| Carry | 0 | 0 | 0 | 1 | 0 | 1 | 1 | 1 | (O2) |

At the right of the graph shown in Fig. 2, the binary values of the input voltages and the output voltages are given. The correlation between the eight possible combinations of input voltages and the corresponding four possible output voltage combinations with the binary addition table given above is readily seen. For example, if two of the three inputs are concurrently energized, say, input terminals A and B, as shown at $t_2$ in the graph, then output terminal O1 is established in its "0" condition, with a +30 volt value, and output O2 is established in its "1" condition, with a +15 volt value. This state corresponds to combination number 4 in the above table, in which an augend of value "1" has added thereto an addend of value "1," without any "carry" from a lower order addition, to produce a sum of value "0" and a carry of value "1," which carry may be supplied to the next higher order. The other seven combinations may be as clearly seen.

It should be noted that the "0" and "1" values supplied from output terminal O1 are opposite in polarity relative to the input values and the carry values. If desired, a conventional inverter may be coupled to the output terminal O1, so that the inverter output will then provide voltage outputs of the same relative polarity as the input and carry voltages.

It should also be noted that, if the circuits connected to the output terminals O1 and O2 are arranged to be responsive to relative voltage changes of at least a minimum amplitude, the clamping diode D4 may be eliminated.

A further distinction which should be noted is that the invention is economical in the use of vacuum tubes. Only six triodes are required, and if duo-triodes are employed, only three tube envelopes, sockets and cathode heaters are required.

Although triode vacuum tubes are shown and described herein, it will be obvious to those skilled in the art that other types of electron discharge devices may be substituted therefor. Also, the voltage values are exemplary, and the apparatus is not limited to operation with the values given.

From the foregoing description it is apparent that the disclosed invention provides a novel and economical arrangement for providing different output voltages from a first and second terminal in accordance with various concurrent combinations of input signals, and has particular utility in performing binary addition where the binary digits are represented by discrete voltage values, by utilizing a stepped voltage, the value of which is varied in accordance with the number of inputs concurrently supplied to the apparatus, to govern the conductive state of a first and second electron discharge device by supplying suitable control voltages to the control elements, and to further govern the value of the operating voltage supplied to the anode of one of the electron discharge devices.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A signal translating device comprising, in combination, voltage generating means for generating a voltage having a first, a second or a third value in accordance with a first, a second or a third input condition, a first and a second electron discharge device, each including an anode, a cathode, and a control electrode, a first and a second output terminal connected to the anodes of said first and said second electron discharge devices respectively, the control electrodes of said first and second electron discharge devices being connected to said voltage generating means, means connected to said voltage generating means for supplying an operating voltage to said first electron discharge device the magnitude of which operating voltage is directly proportional to the voltage generated by said voltage generating means, and means for supplying a substantially constant operating voltage to said second electron discharge device, the parts being proportioned and arranged so that said first electron discharge device supplies an output signal to said first output terminal when and only when the voltage generated by said voltage generating means has said first or said third value and so that said second electron discharge device supplies an output signal to said second output terminal when and only when the voltage generated by said voltage generating means has said second or said third value.

2. A signal translating device comprising, in combination, voltage generating means for generating a voltage having a first, a second or a third value in accordance with a first, a second or a third input condition, a first and a second electron discharge device, each including an anode, a cathode, and a control electrode, a first and a second output terminal connected to the anodes of said first and said second electron discharge devices respectively, means for connecting the control electrodes of said first and said second electron discharge devices to said voltage generating means, means including a first anode load resistor for connecting the anode and cathode of said first electron discharge device to said voltage generating means whereby the anode voltage of said first electron discharge device is governed by said voltage generating means, and means including a second anode load resistor for supplying an operating voltage to the anode and cathode of said second electron discharge device from a source of substantially constant voltage, the parts being proportioned and arranged so that said first electron discharge device supplies an output signal to said first output terminal when and only when the voltage generated by said voltage generating means has said first or said third value, and so that said second electron discharge device supplies an output signal to said second output terminal when and only when the voltage generated by said voltage generating means has said second or said third value.

3. A signal translating device comprising, in combination, voltage generating means for generating a voltage having a first, a second, or a third value in accordance with a first, a second, or a third input condition, an electron discharge device having an anode, a cathode and a control electrode, an anode load resistor connected to said anode, means including said anode load resistor for connecting said anode and said cathode to said voltage generating means, an output terminal connected to said anode, means connecting said control electrode to said voltage generating means, and biasing means for normally establishing said electron discharge device in a predetermined operating state, the parts being proportioned and arranged so that the voltage at said output terminal has a first value when and only when the voltage supplied by said voltage generating means has said first or third value and so that the voltage at said output terminal has a second value when and only when the voltage supplied by said generating means has said second value.

4. A signal translating device comprising, in combination, a signal source having a first, a second, a third and a fourth value of signal voltage decreasing in value in the order named in accordance with a first, a second, a third and a fourth input condition, a first and a second electron discharge device each including an anode, a cathode and a control electrode, a first and a second output terminal connected to the anodes of said first and said second electron discharge devices respectively, means for connecting the control electrodes of said first and said second electron discharge devices to said signal means, means including a first anode load resistor for connecting the anode and cathode of said first electron discharge device to said signal source, a source of substantially constant operating voltage, and means including a second anode load resistor for connecting the anode and cathode of said second electron discharge device to said source of substantially constant operating voltage, the parts being proportioned and arranged so that said first electron discharge device is rendered conductive when said signal voltage has said first, or said second value and is rendered non-conductive when said signal voltage has said third or fourth value, whereby the voltage at the said first output terminal has a first value for said first or said third values of signal voltage and has a second value for said second or said fourth values of signal voltage, and the parts being further proportioned and arranged so that said second electron discharge device is rendered conductive when said signal voltage has said third or said fourth value, whereby the voltage at said second output terminal has a first value for said first or said second values of signal voltage, and has a second value for said third or said fourth values of signal voltage.

5. An electrical circuit for adding binary numbers represented by a least two coincident digit-representing input signals, each signal having a first or a second value representing a binary zero or a binary one value, respectively, said circuit comprising at least two input amplifiers having a common anode load impedance, means for supplying said input signals to said amplifiers, whereby the common anode voltage of said input amplifiers will have a value which decreases in predetermined steps in accordance with the number of input signals having said second value which are coincidently supplied to said input amplifiers, a first and a second electron discharge device, means governed by said common anode voltage for supplying a control voltage to said electron discharge devices, means for supplying an operating voltage to said first electron discharge device in accordance with the value of said common anode voltage, means for supplying a substantially constant operating voltage to said second electron discharge device, a first output terminal connected to said first electron discharge device, and a second output terminal connected to said second electron discharge device.

6. An electrical circuit for adding binary numbers represented by at least two coincident digit-representing input signals, each signal having a first or a second value representing a binary zero or a binary one value, respectively, said circuit comprising at least two input amplifiers having a common anode load impedance, means for supplying said input signals to said amplifiers, whereby the common anode voltage of said input amplifiers will have a value which decreases in predetermined steps in accordance with the number of input signals having said second value which are coincidently supplied to said input amplifiers, a cathode follower having an input and an output, the input of said cathode follower being connected to the common anode load impedance of said input amplifiers to be governed by said common anode voltage, a first and a second electron discharge device, first circuit means for supplying a control voltage from said cathode follower output to said first and said second electron discharge devices, second circuit means for supplying an operating voltage from said cathode follower output to said first electron discharge device, third circuit means· for supplying a substantially constant operating voltage to said second electron discharge device, a first output terminal connected to said first electron discharge device and a second output terminal connected to said second electron discharge device.

7. An electrical circuit for adding binary numbers represented by at least two coincident digit-representing input signals, each signal having a first or a second value representing a binary zero or a binary one value, respectively, said circuit comprising at least two input amplifiers having a common anode load-impedance, means for supplying said input signals to said amplifiers, whereby the common anode voltage of said input amplifiers will have a value which decreases in predetermined steps in accordance with the number of signals having said second value which are coincidently supplied to said input amplifiers, a cathode follower having an input and an output, the input of said cathode follower being connected to the common anode load impedance of said input amplifiers, whereby the voltage at the output of said cathode follower is governed by said common anode voltage, a first and a second electron discharge device, each having an anode, a cathode and at least one control electrode, first circuit means connected to the output of said cathode follower and to the control electrodes of said first and said second electron discharge devices for supplying a control voltage to said control electrodes proportional to the voltage of said cathode follower output, second circuit means including a first anode load impedance for connecting the anode and cathode of said first electron discharge device to said cathode follower output for supplying an operating voltage to said first electron discharge device, a source of substantially constant operating voltage, third circuit means including a second anode load impedance for connecting the anode and cathode of said second electron discharge device to said source of substantially constant operating voltage, a first output terminal connected to the anode of said first electron discharge device, and a second output terminal connected to the anode of said second electron discharge device, the parts being proportioned and arranged so that the voltage at said first output terminal has a first or a second value representing the binary sum of the input signals and the voltage at said second output terminal has a first or a second value representing the binary carry of the input signals.

8. An electrical circuit for adding binary numbers represented by a first, a second and a third digit-representing signal, each of said signals having either a first or a second input value representing a binary zero or a binary one respectively, said first signal representing the augend value, said second signal representing the addend value, and said third signal representing the carry value, said circuit comprising three input amplifiers, one for each of said signals, a common load impedance for said input amplifiers, a cathode follower stage having an input and an output, the input of said cathode follower stage being connected to said common load impedance whereby the voltage at the output of said cathode follower is varied in discrete steps in descending magnitude in accordance with the number of input amplifiers which are supplied concurrently with signals having said second value, a first and a second electron discharge device, each having an anode, a cathode, and at least one control electrode, first circuit means for supplying a control voltage to said control electrodes of said first and said second electron discharge devices proportional to the voltage of said cathode follower output, second circuit means including a first anode load impedance for connecting the anode and the cathode of said first electron discharge device to said cathode follower output, whereby said first electron discharge device is supplied with an operating voltage proportional to the voltage of said cathode follower output, a source of substantially constant operating voltage, third circuit means including a second anode load impedance for connecting the anode and the cathode of said second electron discharge device to said source of substantially constant operating voltage, a first output terminal connected to the anode of said first electron discharge device, and a second output terminal connected to the anode of said second electron discharge device, the parts being proportioned and arranged so that the voltage at said first output terminal has a first value, representing a binary zero when no signals having said second input value are supplied to said input amplifier, or when two signals having said second value are supplied to said input amplifiers, and so that the voltage at said first output terminal has a second value, representing a binary one, when one or three of said input amplifiers have input signals having said second input values supplied thereto, the parts being further proportioned and arranged so that the voltage at said second output terminal changes from a first value, representing a binary zero, to a second value, representing a binary one, when and only when two or three of said input amplifiers are supplied with signals having said second input value, whereby the output voltages at said first and said second output terminals represent the sum and carry digits of the binary addition of the input digit-representing signals.

References Cited in the file of this patent

UNITED STATES PATENTS

| | | |
|---|---|---|
| 2,404,250 | Rajchman | July 16, 1946 |
| 2,543,442 | Dench | Feb. 27, 1951 |
| 2,761,019 | Hall | Aug. 28, 1956 |